United States Patent
Huang et al.

(10) Patent No.: US 12,089,286 B2
(45) Date of Patent: Sep. 10, 2024

(54) METHOD AND APPARATUS FOR SEARCHING AND RELAYING DISCOVERY OF DEVICES

(71) Applicant: SONY CORPORATION, Tokyo (JP)

(72) Inventors: Sangxia Huang, Lund (SE); Andrej Petef, Lund (SE)

(73) Assignee: Sony Group Corporation, Tokyo (JP)

( * ) Notice: Subject to any disclaimer, the term of this patent is extended or adjusted under 35 U.S.C. 154(b) by 719 days.

(21) Appl. No.: 17/045,349

(22) PCT Filed: Jan. 25, 2019

(86) PCT No.: PCT/US2019/015151
§ 371 (c)(1),
(2) Date: Oct. 5, 2020

(87) PCT Pub. No.: WO2019/194886
PCT Pub. Date: Oct. 10, 2019

(65) Prior Publication Data
US 2021/0029528 A1    Jan. 28, 2021

(30) Foreign Application Priority Data

Apr. 5, 2018 (SE) .................................. 1830114-3

(51) Int. Cl.
*H04W 8/00* (2009.01)
*H04B 17/318* (2015.01)
(Continued)

(52) U.S. Cl.
CPC .......... *H04W 8/005* (2013.01); *H04B 17/318* (2015.01); *H04W 4/06* (2013.01);
(Continued)

(58) Field of Classification Search
CPC ....... H04W 8/005; H04W 4/23; H04B 17/318
(Continued)

(56) References Cited

U.S. PATENT DOCUMENTS 10,026,287 B2 * 7/2018 Sarkar ................ G08B 13/2465
2001/0034646 A1 10/2001 Hoyt et al.
(Continued)

FOREIGN PATENT DOCUMENTS

EP 2884775 A1 6/2015
WO 2017051173 A1 3/2017

OTHER PUBLICATIONS

International Search Report and Written Opinion for corresponding International Application No. PCT/US2019/015151, mailed on Mar. 15, 2019, 32 pages.

*Primary Examiner* — Chuck Huynh
(74) *Attorney, Agent, or Firm* — Tucker Ellis LLP

(57) ABSTRACT

An observer device (12) listens for advertising messages from broadcast devices (14) in an environment, transmits scan request messages to broadcast devices, and subsequently receives scan response messages. The observer device (12) can connect to a broadcast device (14) and configure the broadcast device (14) to a scanning mode. The broadcast device (14) selected for scanning listens for advertising messages from other broadcast devices (14). The broadcast device (14) relays information related to these other broadcast devices (14) back to the observer device (12).

10 Claims, 9 Drawing Sheets

(51) Int. Cl.
  *H04W 4/06* (2009.01)
  *H04W 4/23* (2018.01)
  *H04W 28/06* (2009.01)
  *H04W 48/16* (2009.01)
  *H04W 76/11* (2018.01)

(52) U.S. Cl.
  CPC ............ *H04W 4/23* (2018.02); *H04W 28/06* (2013.01); *H04W 48/16* (2013.01); *H04W 76/11* (2018.02)

(58) Field of Classification Search
  USPC .......................................................... 370/329
  See application file for complete search history.

(56) References Cited

U.S. PATENT DOCUMENTS

2015/0339718 A1    11/2015  Walton
2017/0034646 A1     2/2017  Song

\* cited by examiner

METHOD AND APPARATUS FOR SEARCHING AND RELAYING DISCOVERY OF DEVICES

RELATED APPLICATION DATA

This applications claims the benefit of Swedish Patent Application No. 1830114-3, filed Apr. 5, 2018, the disclosure of which is incorporated herein by reference in its entirety.

TECHNICAL FIELD OF THE INVENTION

The technology of the present disclosure relates generally to wireless communications among electronic devices in an environment and, more particularly, to a method and apparatus for search and discovery of devices in an area.

BACKGROUND

Trackable tags have often been employed to track a plurality of objects in an environment. Typically, respective tags are coupled to or otherwise associated with subjects for the purposes of communicating a location or a status of the subject or tag to one or more interested parties. Bluetooth technology may be employed to implement such a tracking system. In particular, a Bluetooth Low Energy (BLE) protocol provides a suitable basis to implement a tracking system, such as an animal tracking system for example.

With a BLE implementation, a plurality of broadcast devices (e.g. advertising tags or beacons) exist within an environment to be continuously scanned by one or more observer devices. The tags broadcast advertising messages at predetermined frequencies know to the observer devices. The advertising messages may include application-specific information according to protocols or designs of the implementation. For example, in an animal tracking scenario, the advertising messages broadcasted by tags may include status information for the respective subjects. In accordance with BLE, observer devices listen for advertising messages, transmit scan request messages to tags, receive scan response messages from tags, and, if need, initiate connections with tags to send and receive arbitrary information.

The tags or broadcast devices are typically configured to conserve energy by limiting output power or advertising frequency. Further, in some scenarios, the subjects (and accordingly the tags) may roam about the environment. Thus, there may be moments when the observer device is unable to receive advertising messages from one or more tags due to range issues, environmental obstructions, or other conditions that impede reception of advertising message from operational tags. Due to such conditions, a tag previously known to the observer device may go unheard for a period of time and be considered missing. In an animal tracking scenarios, a missing tag is problematic since the animal may have escaped, is otherwise lost, the tag may be inoperable, or the animal is injured. Considerable resources may be expended to verify the subject's status in such events.

SUMMARY

The disclosed approach provides for searching and discovery of one or more missing devices in an environment. An observer device scans for broadcast devices (also referred to as tags or beacons) within an environment to maintain up-to-date information on subjects respectively associated with the broadcast devices. In particular, the observer device listens for advertising messages from the broadcast devices, transmit scan request messages to devices from which advertisements are received, and subsequently receives scan response messages responsive to the scan request messages. The observer device may determine that an advertising message from a broadcast device, known to the observer device, has not been received for a period of time. The observer device may consider that broadcast device to be missing and initiate an extended search.

The observer device can connect to a broadcast device and configure the broadcast device to a scanning mode. The scanning device, i.e. the broadcast device selected for scanning, may listen for advertising messages from other broadcast devices. When the scanning device hears advertising messages from other devices, the scanning device relays information related to these devices back to the observer device. Accordingly, the disclosed approach provides an efficient and robust means of discovering and relaying existence and status of every broadcast device in an environment. Moreover, as described below, the disclose approach maintain compliance with communication standards (i.e. BLE standard).

According to one aspect of the disclosure, a method of searching for broadcast devices by an observer device includes receiving respective advertising messages from one or more broadcast devices; determining whether to initiate an extended search for additional broadcast devices; selecting a scanning device from among the one or more broadcast devices from which advertising messages are received; requesting the scanning device to perform a search for additional broadcast devices; and receiving at least one message with search results from the scanning device.

According to one embodiment, the method can further include transmitting scan request messages to each of the one or more broadcast devices from which advertising messages are received; and receiving respective scan response messages from the one or more broadcast devices in response to the scan request messages.

According to one embodiment of the method, the message containing the search results is an advertising message or both the advertising message and a scan response message.

According to one embodiment of the method, the search results include information corresponding to one or more broadcast devices forming a set of devices within a range of the observer device and information corresponding to one or more broadcast devices forming a set of devices outside the range of the observer device.

According to one embodiment of the method, the information corresponding to the set of devices within the range of the observer device includes identities of broadcast devices estimated to be within a threshold distance from the scanning device.

According to one embodiment of the method, the method can further include storing signal strength information for the one or more broadcast devices.

According to one embodiment of the method, selecting the scanning device can include selecting a broadcast device estimated to be distant based on the signal strength information.

According to one embodiment of the method, selecting the scanning device includes selecting a broadcast device based on the signal strength information and search results from a previous scanning device.

According to one embodiment of the method, the method can further include assigning a score to each broadcast device based on the signal strength information; reducing the score associated with any broadcast device indicated in the search results from the scanning device as being within the threshold distance from the scanning device; and selecting the scanning device based on respective scores assigned to each broadcast device.

According to one embodiment of the method, requesting the scanning device to perform a search includes indicating a compression scheme to be utilized to package the search results.

According to one embodiment of the method, the compression scheme is a lossy compression scheme.

According to one embodiment of the method, the method can further include evaluating the search results for ambiguity; and requesting the scanning device to retransmit the search results with a different compression scheme.

According to one embodiment of the method, the method can further include comprising selecting a second scanning device to perform a search simultaneously with the scanning device.

According to another aspect of the disclosure, an observer device includes a communications interface over which wireless communications with broadcast devices are carried out; and a control circuit configure to control scanning for broadcast devices, wherein the control circuit causes the observer device to: receive respective advertising messages from one or more broadcast devices; determine whether a previously known broadcast device is missing based on the received advertising messages; select a scanning device from among the one or more broadcast devices from which advertising messages are received, when determined that a previously known broadcast device is missing; connect with the scanning device to request the scanning device to perform an extended search for additional broadcast devices; and receive at least one message with search results from the scanning device.

According to one embodiment of the observer device; the control circuit further causes the observer device to: evaluate the search results; and terminate the extended search when the search results indicate the missing broadcast device is found.

According to one embodiment of the observer device, the control circuit further causes the observer device to: evaluate the search results; determine that the missing broadcast device is not found; select a next scanning device from among the one or more broadcast devices; and request the next scanning device to perform a search for additional broadcast devices.

According to one embodiment of the observer device, the control circuit further causes the observer device to: evaluate the search results; identify when the search results introduce ambiguity regarding identities of additional broadcast devices discovered via the extended search; and request retransmission of the search results using a different compression scheme determine whether the missing broadcast device is found.

According to another aspect of the disclosure, a method of searching for broadcast devices includes receiving a request from an observer device to perform an extended search for additional broadcast devices; initiating device scanning and receiving respective advertising messages from one or more broadcast devices during device scanning; processing each advertising message received based on an observer proximity flag included in the advertising message; packaging information from the processing into search results; and transmitting the search results in at least one message to the observer device.

According to one embodiment of the method, the request from the observer device indicates a compression scheme and the packaging of the information from the processing into search results includes utilizing the compression scheme.

According to one embodiment of the method, processing each advertising message includes extracting an identity of a broadcast device associated with the advertising message for inclusion in the search results when the observer proximity flag is unset in the advertising message; and when the observer proximity flag is set, measuring a signal strength associated with the advertising message; comparing the signal strength to a threshold value; and extracting the identity of the broadcast device for inclusion in the search results when the signal strength exceeds the threshold.

According to one embodiment of the method, the method further includes broadcasting an advertising message; determining whether a scan request message is received from the observer device; setting the observer proximity flag when the scan request message is received from the observer device; and unsetting the observer proximity flag when the scan request message is not received from the observer device.

According to one embodiment of the method, the at least one message including the search results is at least one of the advertising message, the scan response message, or both.

According to one embodiment of the method, the method further includes receiving a request for retransmission of the search results from the observer device; wherein the request for retransmission indicates a different compression scheme; and retransmitting the search results to the observer device in accordance with the different compression scheme.

According to another aspect of the disclosure, an broadcast device includes a communication interface over which wireless communications with at least one of an observer device or another broadcast device are carried out; and a control circuit configured to control scanning for other broadcast devices; wherein the control circuit configures the broadcast device to: scan for additional broadcast devices in response to a request from an observer device; based on received advertising messages from the other broadcast devices, identify a first set of broadcast devices that includes other broadcast devices in proximity to the observer device and within a threshold distance from the broadcast device, and identify a second set of broadcast devices that includes other broadcast device not in proximity to the observer device; aggregate information corresponding to the first set of broadcast device and the second set of broadcast devices in accordance with a compression scheme; and transmit the aggregated information to the observer device in at least one of an advertising message or a scan response message.

According to one embodiment of the broadcast device, the control circuit further configures the broadcast device to: broadcast the advertising message periodically based on a configured advertising interval; listen for a scan request message from the observer device in response to the advertising message; when the scan request message is received, set an observer proximity flag included in the advertising message; and when the scan request message is not received; unset the observer proximity flag in the advertising message.

DETAILED DESCRIPTION OF EMBODIMENTS

Introduction

Figure 1:
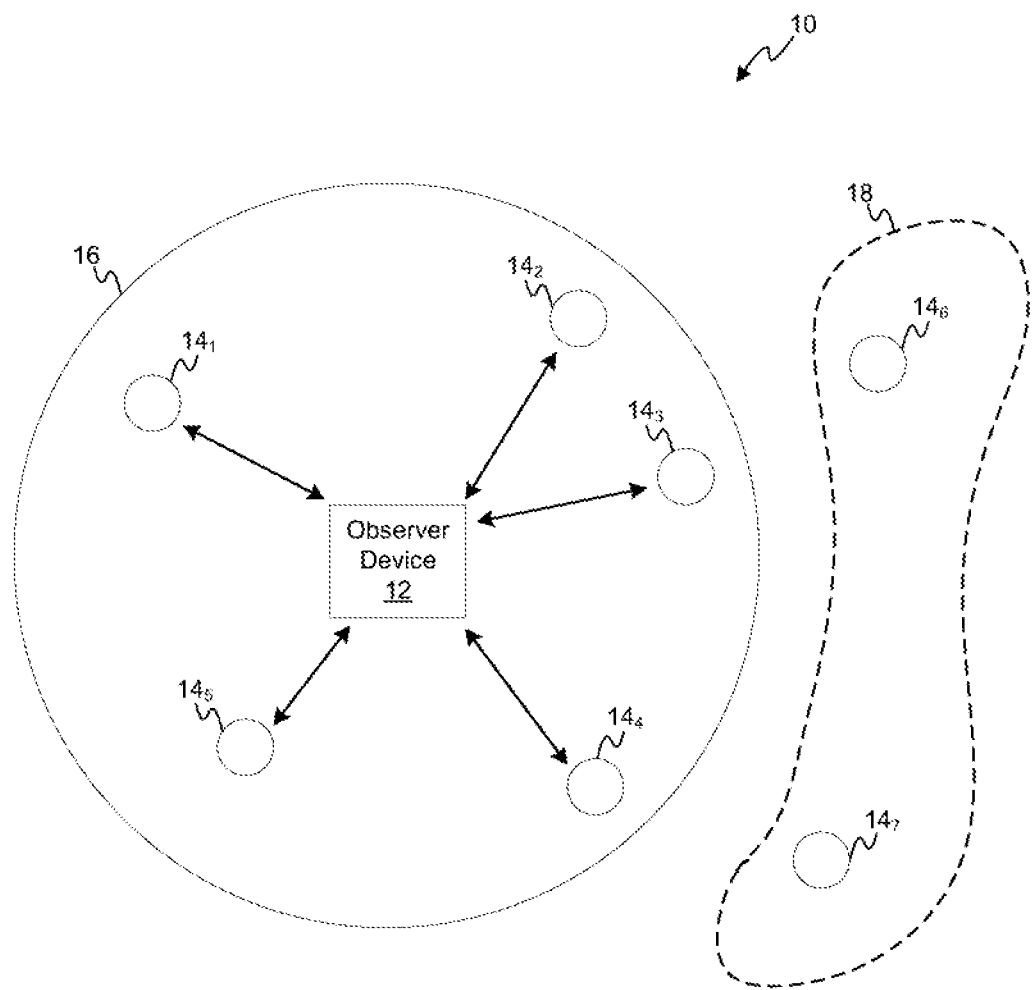
FIG. 1 is a schematic diagram of a representative system that includes various devices providing status information to an observer in an environment.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for searching for beacons or tags in an environment. An observer can select a tag to switch to a scanning mode in order to discover additional tags that may be missing from the perspective of the observer. The tag may relay information related to discovered devices back to the observer. The searching procedure described herein may increase an effective range of the observer, comply with communication and device standards, while also remaining power conscious.

Search and Relay Procedures for Missing Devices

With reference to FIG. 1, a system 10 may include an observer device 12 and one or more broadcast devices 14. The observer device 12 may a computing device configured to scan for broadcast devices 14 in order to maintain up-to-date information on subjects or objects respectively associated with the broadcast devices 14 and located within an environment. Broadcast devices 14 may be tags, beacons, or other computing devices that may be portable and attachable to objects for tracking. According to an embodiment, the system 10 may utilize a Bluetooth Low Energy (BLE) protocol for communications and observer device 12 and the broadcast devices 14 may implement relevant BLE standards. To facilitate description of aspects, the disclosed innovation is generally described in connection with BLE. It is to be appreciated, however, that aspects described herein may be utilized with other communication and device standards.

The broadcast devices 14 may periodically broadcast advertising messages that include application-specific information according to the purpose of system 10. The observer device 12 may scan for the advertising message and receive the application-specific information contained therein. For example, the application-specific information may include statuses of associated subjects in a subject-tracking scenario. Advertising messages from broadcast devices $14_{1-5}$ may be received by the observer device 12 as those devices are within a range 16 of observer device 12. The range 16 may be generally defined by maximum distance for which an advertising message can propagate due to signal distance attenuation due or other environmental conditions such as obstacles. In response to receiving advertising messages, observer devices 12 may transmit respective scan request messages and, in turn, receive scan response messages from broadcast devices 14 in range 16. Further, the observer device 12 can initiate a connection with broadcasted devices 14 to send and receive arbitrary information.

Broadcast devices $14_{6-7}$, which are outside of range 16 or otherwise obstructed, may be considered missing devices 18 when observer device 12 does not receive their advertising messages. In particular, the observer device 12 may classify a broadcast device 14 into missing devices 18 when an advertising message is not received for a predetermined time period (e.g. one or more advertising intervals).

Figure 2:
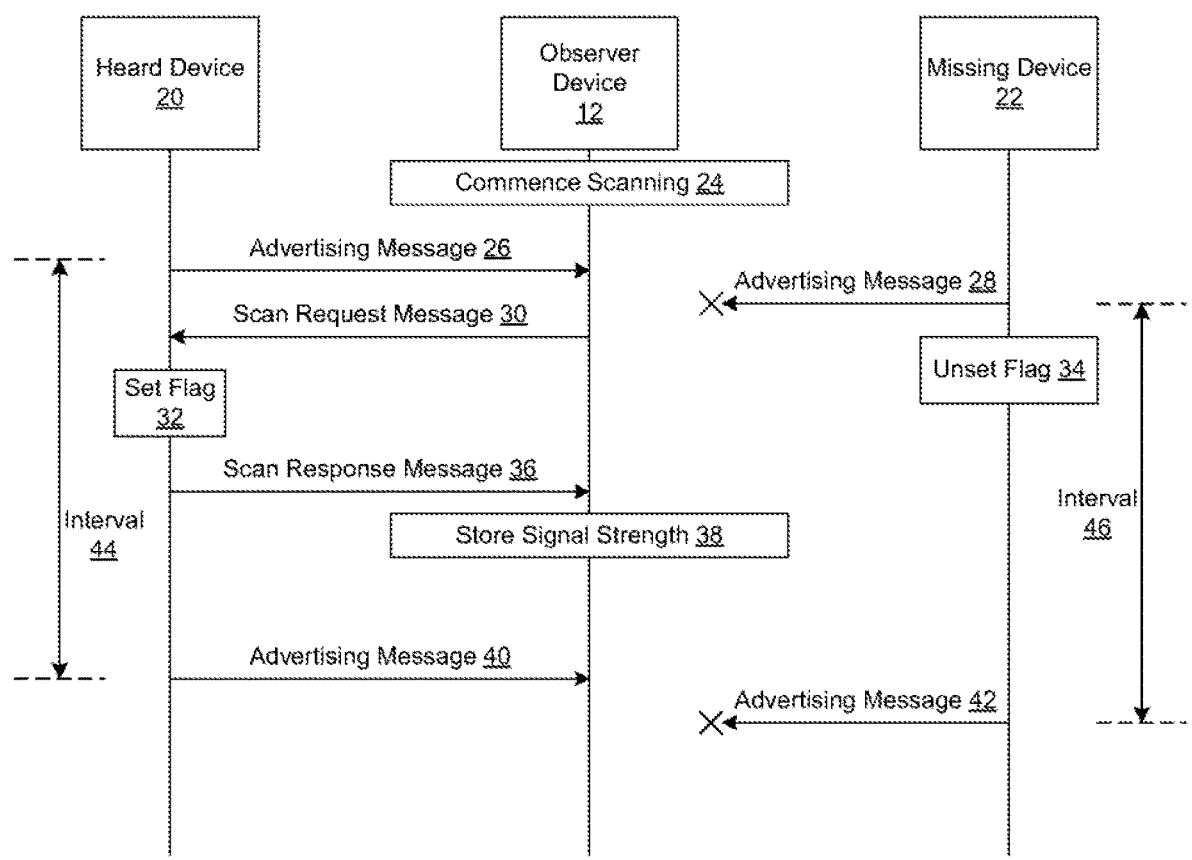
FIG. 2 is a sequence diagram of a normal operation of the system of FIG.

Turning to FIG. 2, an exemplary sequence diagram of normal operations of system 10, which have been generally described above. In FIG. 2, communications between and actions of observer device 12, a heard device 20, and a missing device 22 are depicted. As utilized herein, a heard device is a device within range 16 of observer device 12, such as broadcast devices $14_{1-5}$ and a missing device is a device belonging to the set of missing devices 18, such as broadcast devices $14_{6-7}$, for which the observer device 12 does not receive advertising messages.

The observer device 12 commences scanning 24 for advertising messages from broadcast devices. Both heard device 20 and missing device 22 transmit advertising messages periodically. For example, as shown in FIG. 2, heard device 20 transmits advertising messages, such as messages 26 and 40, according to an advertising interval 44. Missing device 22 transmits advertising messages, such as messages 28 and 42, according to an advertising interval 46.

Heard device 20 transmits advertising message 26, which is received by the observer device 12. In response, the observer device 12 transmits a scan request message 30 to the heard device 20. In accordance with an aspect, broadcast devices 14 maintain a flag indicative of being in observer proximity. As shown in FIG. 2, heard device 20 sets the flag at 32 upon receiving the scan request message 30 from the observer device 12. The flag indicates that advertising message 26 was heard by the observer device 12 and, thus, that heard device 20 is in proximity to the observer device 12. Responsive the scan request message 30, the heard device 20 transmits a scan response message 36 to the observer device 12.

The observer device 12 measures and stores signal strength information at 38. The measured and stored information may be a received signal strength indicator (RSSI) and may be acquired from the advertising message 26, the scan response message 36, or both. As described in greater detail below, the signal strength information and the observer proximity flag facilitate extended search operations.

Whether due to an obstruction or distance, advertising message 28 from missing device 22 is not received by observer device 12. Observer device 12 does not send a scan request message to missing device 22 since observer device 12 did not receive advertising message 28. Accordingly, missing device 22 does not set the observer proximity flag or, if the flag was previously set, unsets the flag at 34.

During normal operations, the sequence of FIG. 2 repeats approximately every advertising interval. However, observer device 12 may have previously received an advertising message from missing device 22 and, thus, may recognize the device as missing after a period of time. In such cases, the observer device may initiate extended search operations to discover missing device 22.

Figure 3:
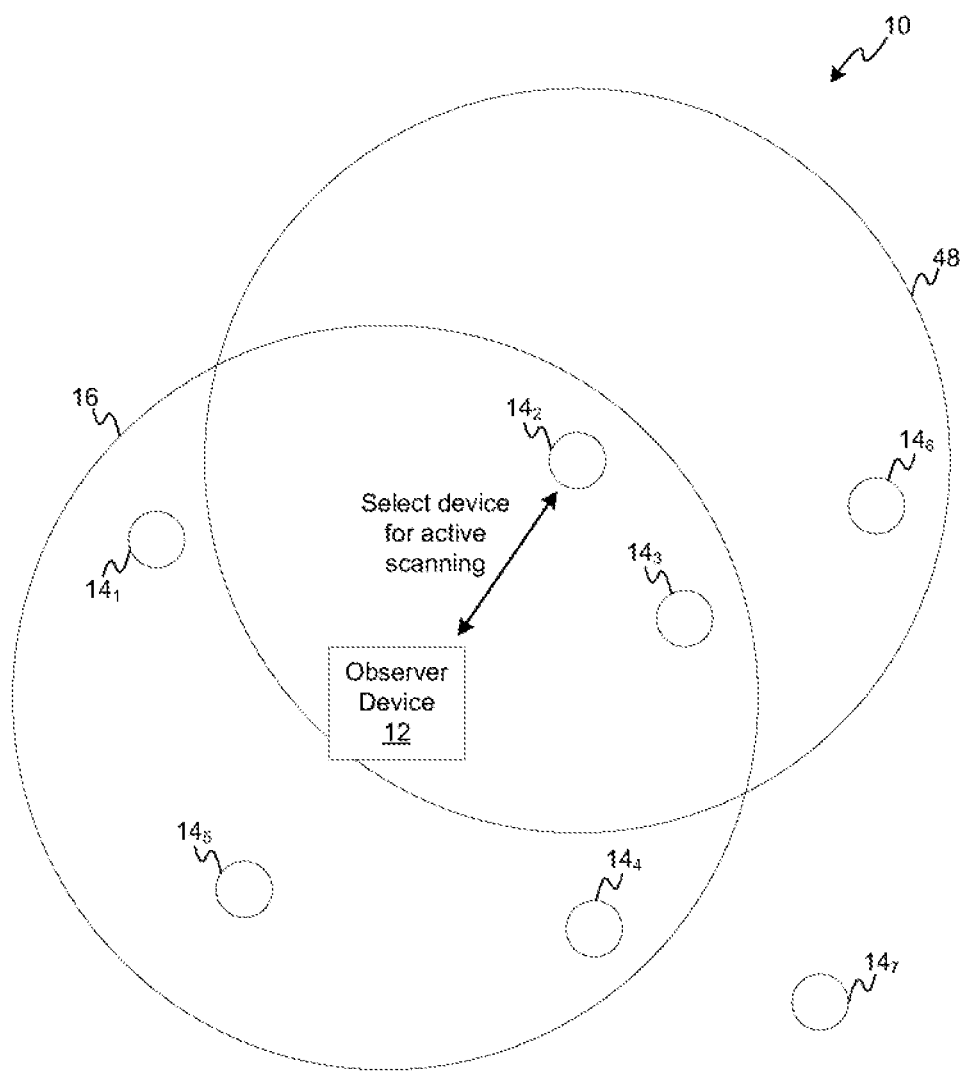
FIG. 3 is a schematic diagram of an initiation of an extended search mode in the system of FIG. 1 according to an aspect.

Turning briefly to FIG. 3, illustrated is a schematic diagram of an initiation of extended search operations in system 10. The observer device 12 selects a broadcast device 14, for example device 14₂, to perform a device scan. Device 14₂ may have a range 48 within which it may receive advertising messages from other broadcast devices 14. Accordingly, by utilizing device 14₂ for an extended search, an effective range of observer device 12 increases.

Observer device 12 selects broadcast device 14₂ based on the stored signal strength information as well as assumed environmental information such as estimated distance and location of obstructions. For example, to reduce an area of overlapping ranges and increase an overall search area, observer device 12 may select a broadcast device to perform a device search that is located near an edge of range 16. In addition, as described in detail below, observer device 12 may also utilize information acquired from previous extended searches to select a subsequent scanning device. To cause device 14₂ to perform a search, observer device 12 can establish a connection with device 14₂ and configure the device to perform the search within the device's advertising interval (e.g. between transmission of advertising messages).

Figure 4:
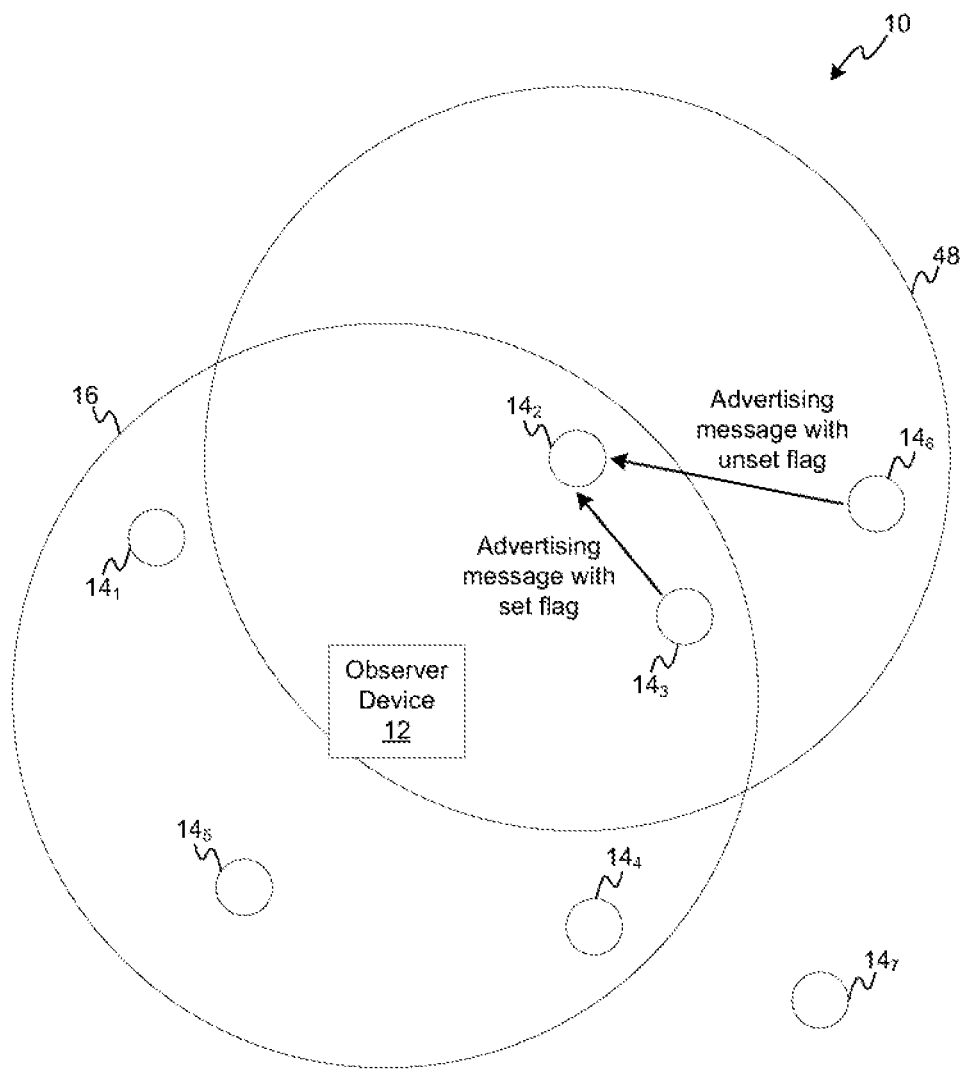
FIG. 4 is a schematic diagram of a scanning mode of a device in the system of FIG. 1.

Now referring to FIG. 4, while in a scanning mode, device 14₂ may receive advertising messages from other broadcast devices 14 within range 48 of device 14₂. As shown in the example of FIG. 4, device 142 may receive an advertising message with a set observer proximity flag from device 14₃ and an advertising message with an unset observer proximity flag from device 14₆. As mentioned above, the advertising message from device 14₆ is not received by the observer device 12 and, thus, device 14₆ does not receive a scan request message that triggers setting of the observer proximity flag. Device 14₃, however, is within range 16 and, accordingly, sets the observer proximity flag when the scan request message is received. The advertising message from device 14₃ includes a set observer proximity flag.

Figure 5:
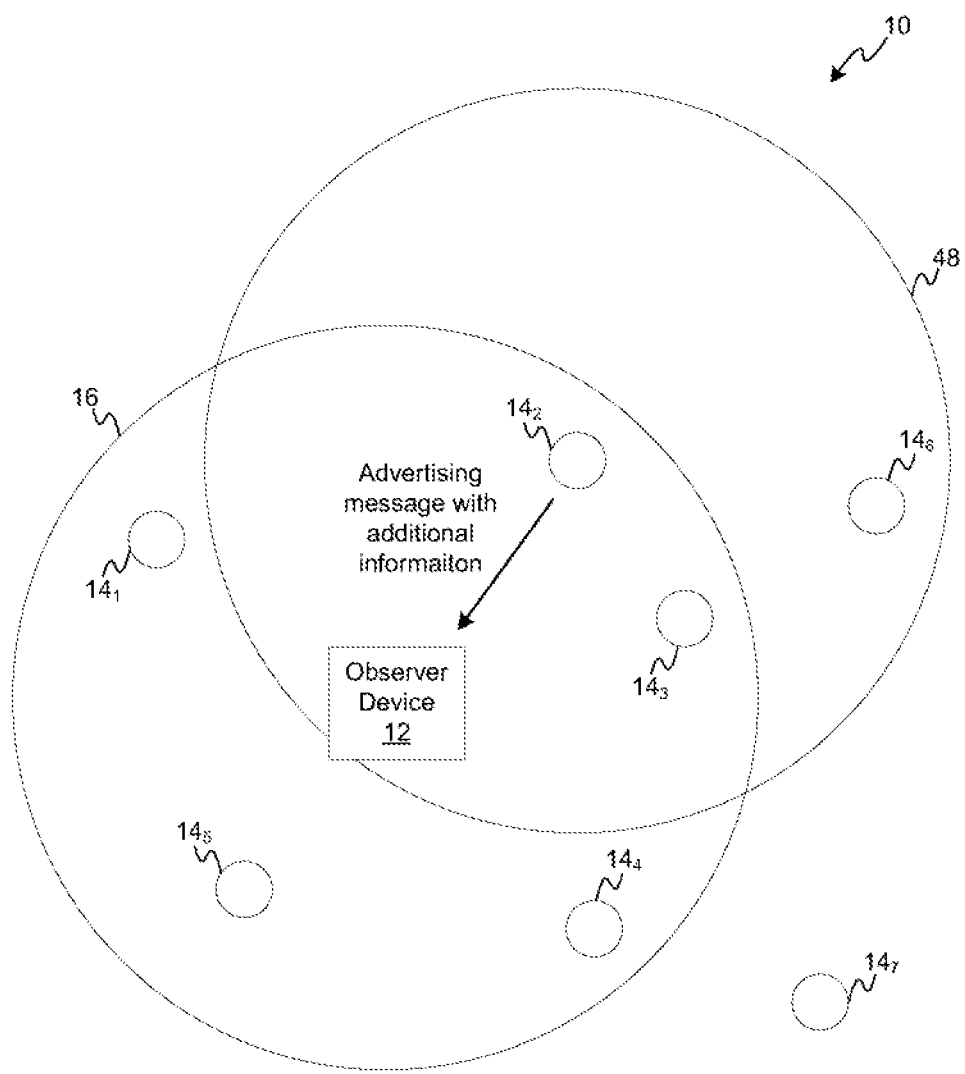
FIG. 5 is a schematic diagram of relaying of search results to an observer in the system of FIG. 1.

Turning now to FIG. 5, illustrated is an exemplary schematic diagram of relaying search results to the observer device 12. After receiving the advertising messages as shown in FIG. 4, the device 14₂ aggregates information from the received messages and incorporates the information into its own advertising message transmitted to observer device 12. The information (e.g., the search results) may be included in multiple advertising messages to ensure receipt by the observer device 12.

According to an aspect, device 14₂ may extract information from received advertising messages differently dependent on whether or not the observer proximity flag is set. For example, when the flag is not set, the device 14₂ may recognize the associated device as a missing device. Thus, the device 14₂ extracts an identity and status for inclusion in the additional information relayed to the observer device 12. When the flag is set, however, device 14₂ may recognize the associated device as being in range of the observer device 12 and may not automatically include the device in search results. Rather, device 14₂ can measure a signal strength and include the device in the search results if the signal strength exceeds a predetermined threshold. In other words, when discovering devices already found by the observer device 12, device 14₂ may only report those devices when the devices are near (i.e. within a predetermined distance) to further inform the observer device 12 of a general distribution of devices in the environment.

Information regarding closest neighbors to device 14₂ may improve search efficiency through intelligent selection of devices. For example, in the examples illustrated in FIGS. 1 and 3-5, device 14₇ remains missing after the scan by device 14₂. Observer device 12 may determine to continue extended search operations and select a next device to perform a scan. Since device 14₃ is reported to be close to device 14₂, observer device 12 may select a different device to scan so as to cover a larger area.

More particularly, observer device may assign a score to each broadcast device 14 selectable to perform a device scan. The score may be partially based on a distance of the broadcast device 14 from the observer device 12. For instance, the signal strength information can be utilized to adjust the score such that the broadcast device 14 farther away (i.e. lower signal strength) is assigned a higher score. In addition, to widen a search area, the score associated with a broadcast device 14 may be reduced when it is reported closed to another scanning device. The observer device 12 may select a broadcast device 14 as a scanning device based on the scores. For example, the observer device 12 may make a random selection where a probability of selection is proportional to the score.

Figure 6:
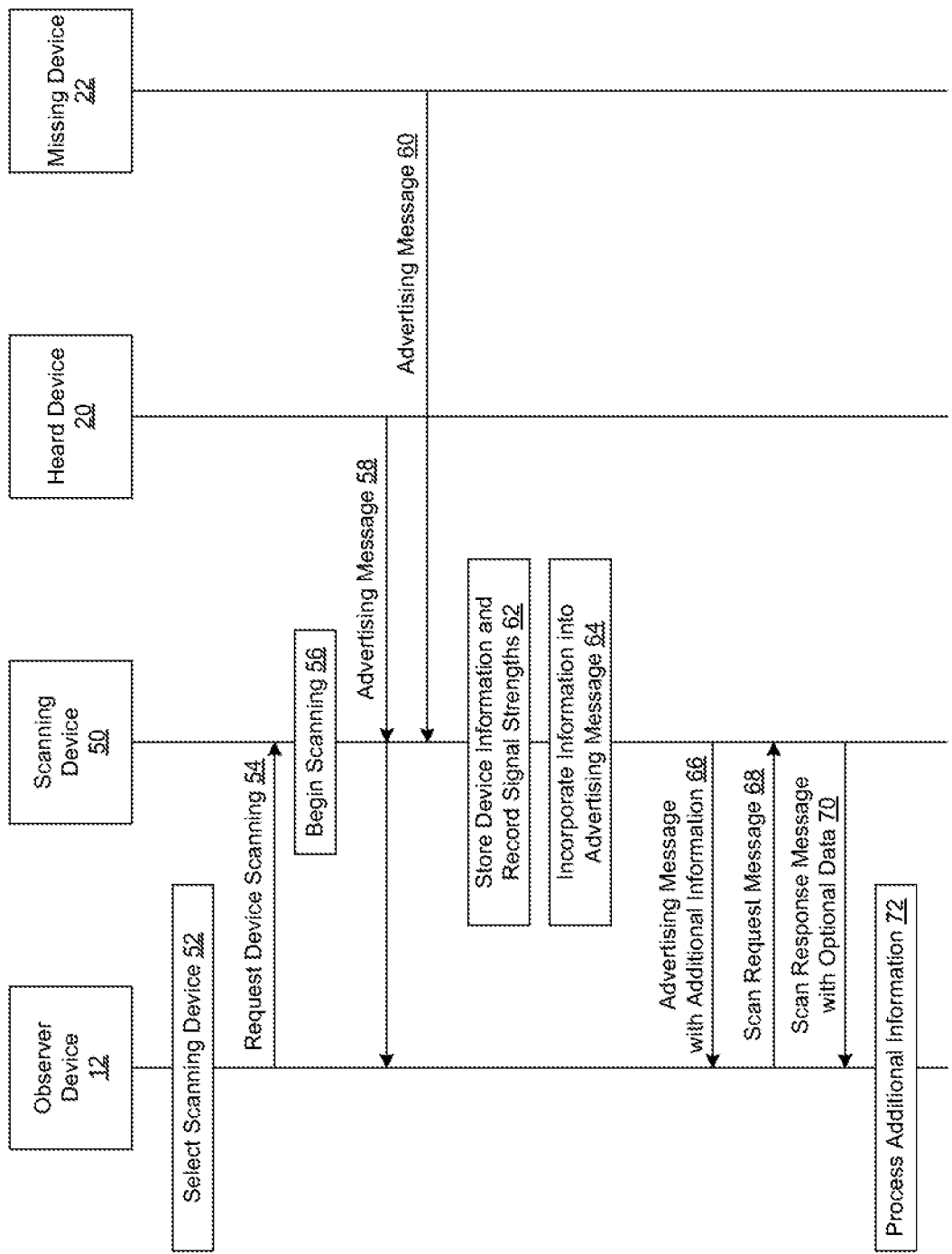
FIG. 6 is a sequence diagram of an extended search operation of the system of FIG. 1.

Turning now to FIG. 6, an exemplary sequence diagram of an extended search mode for the system 10 is illustrated. In FIG. 6, communications between, as well as actions of, observer device 12, heard device 20, missing device 22, and a scanning device 50 are depicted. As utilized herein, a scanning device is a broadcast device 14, such as device 14₂, selected and configured by the observer device 12 to perform a device scan as part of extended search operations of system 10.

The observer device 12 selects a scanning device at 52 to initiate the extended search mode. Observer device 12 may select the scanning device 50 based on stored signal strength information as well as other search result information if available. Once selected, the observer device 12 requests the scanning device 50 to perform a device scan at 54. In particular, the observer device 12 may establish a connection with the scanning device 50 and configure the device 50 accordingly to perform the device scan.

The scanning device 50 begins the device scan at 56. During the device scan, the scanning device 50 listens for advertising messages from other broadcast devices 14. The scanning device 50 may listen between the times at which the scanning device 50 is scheduled to transmit its own advertising messages.

While scanning, the scanning device 50 may receive advertising messages from other devices such as advertising messages 58 and 60 sent from heard device 20 and missing device 22, respectively. The observer device 12 may also receive the advertising message 58 from heard device 20 and responds in kind as shown in FIG. 2. Those details are omitted here in FIG. 7.

The scanning device 50, at 62, may store information contained in the advertising messages 58 and 60 as well as measure and store signal strength information associated with those messages. At 64, the scanning device 50 may incorporate at least a portion of that information into an advertising message for relaying back to observer device 12. The decision regarding what information to include in the advertising message may be based on the information contained in the advertising messages 58 and 60 as well as the signal strength information. For example, identity and status information from advertising message 60 may be incorporated since advertising message 60 will include an unset observer proximity flag. However, the observer proximity flag is set in advertising message 58. Accordingly, information from advertising message 58 is incorporated when a corresponding signal strength exceeds a preconfigured threshold.

Observer device 12 may indicate a particular packaging scheme to be utilized by scanning device 50 to aggregate search results into its advertising message. For instance, under the BLE standard, about 31 bytes of user configurable payload data is available in the advertising message. Accordingly a hash function, compression, or some other encoding scheme is employed if the search results to be relayed exceeds the space available. The compression ro encoding scheme may be a lossy compression scheme in view of the space limit. Again, as mentioned previously, the scheme employed by scanning device 50 may be selected by the observer device 12 when configuring the scanning device 50 to the scanning mode.

The scanning device 50 transmits an advertising message 66 that includes additional information (e.g. scan results and information from relevant devices discovered). The observer device 12 may send a scan request message 68 to indicate receipt of the advertising message 66. In turn, the scanning device 50 sends a scan response message 70 to the observer device 12. The scan response message 70 may include optional data. For instance, if the advertising message 66 could not accommodate all information to be relayed to the observer device 12, the remaining data can be relayed via the scan response message 70.

The observer device 12 may process the additional information relayed by scanning device 50 via the advertising message 66 and/or the scan response message 70. For example, the observer device 12 may determine that all missing devices have been found and return to normal operations. Alternatively, the observer device 12 may determine that additional missing devices have yet to be found and, thus, the extended search should continue with a selection of a next scanning device. As mentioned previously, the selection of the next scanning device can be influenced, in part, from the additional information relayed by the scanning device 50. Further, the observer device 12 may determine that the additional information is ambiguous. For instance, the compression or encoding scheme may produce ambiguous data. Thus, the observer device 12 may request retransmission of the information by the scanning device 50 in accordance with a different scheme.

Figure 7:
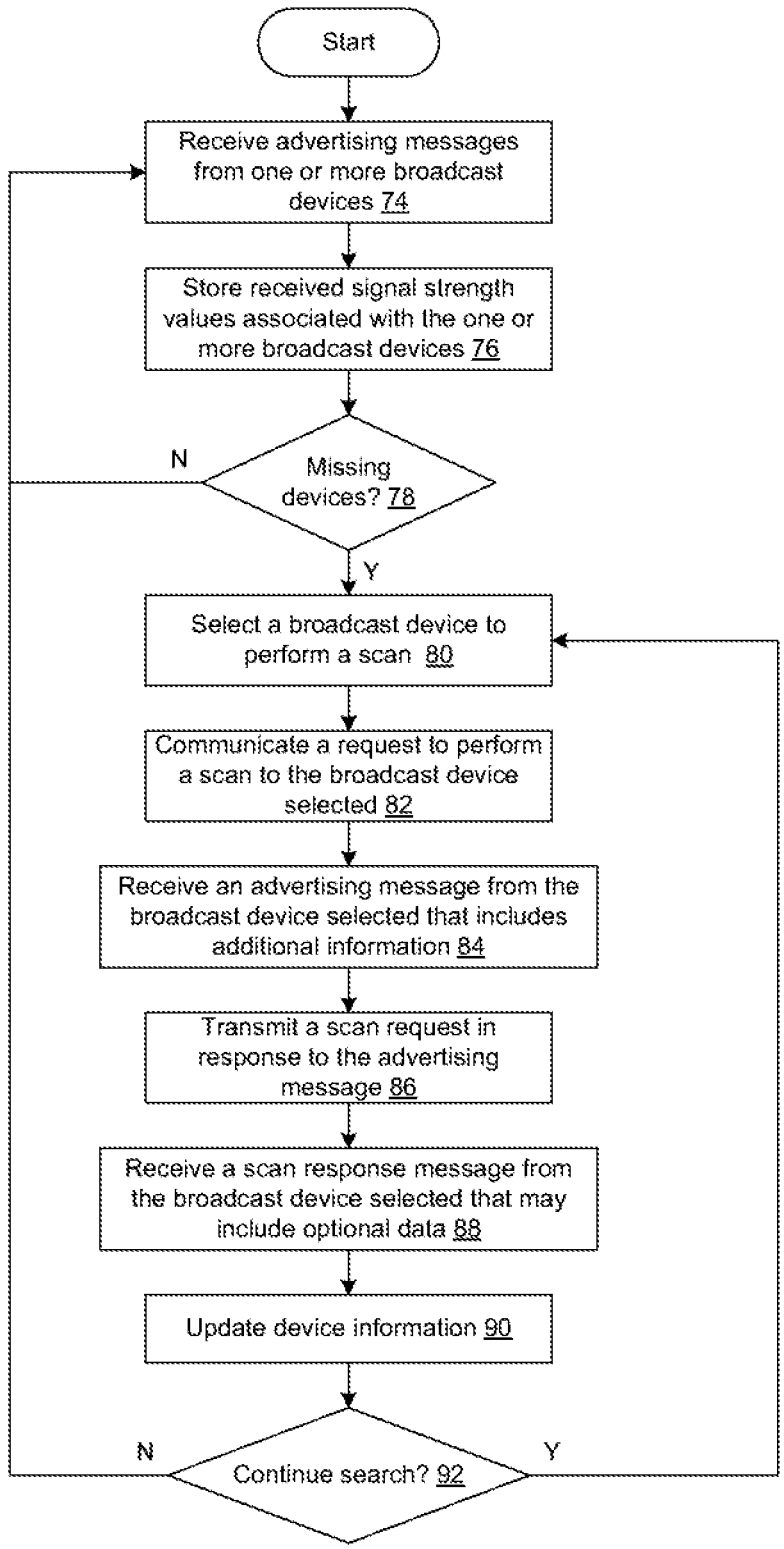
FIG. 7 is a flow diagram of a representative method of scanning for broadcast devices in an environment from a perspective of an observer.

With reference to FIG. 7, shown is an exemplary flow diagram representing steps that may be carried out by the observer device 12 when executing logical instructions to carry out an extended search for broadcast devices 14 in an environment. Complimentary operations of the broadcast device 14 are shown FIG. 8, which shows an exemplary flow diagram representing steps that may be carried out by the broadcast device 14 when executing logical instructions to carry out a device scan operation. Although illustrated in a logical progression, the blocks of FIGS. 7 and 8 may be carried out in other orders and/or with concurrence between two or more blocks. Therefore, the illustrated flow diagrams may be altered (including omitting steps or adding steps not shown in order to enhance description of certain aspects) and/or may be implemented in an object-oriented manner or in a state-oriented manner. Also, the method represented by FIG. 7 may be carried out apart from the method of FIG. 8 and vice versa.

Referring to actions carried out by the observer device 12, the logical flow of performing an extended search operation may start in block 74. In block 74, it may be assumed that the observer device 12 receives advertising messages from one or more broadcast devices 14. In block 76, the observer station 12 stores signal strength information associated with the one or more broadcast device 14 based on the received advertising messages. Though omitted in FIG. 7, the observer station 12 may transmit scan request messages and receive corresponding scan response messages as described above as part of normal operations. In block 78, the observer station 12 determines if any missing devices exist. For example, the observer device 12 may know of particular broadcast devices 14 from having received advertising messages previously. If no advertising messages are received from those particular broadcast devices for a period of time, the observer device 12 may consider those broadcast devices to be missing.

If the observer device 12 determines there are no missing devices, the observer station 12 maintains normal operations and returns to listening for advertising messages in block 74. If, in block 78, the observer device 12 determines there are missing devices, then observer device 12 begins extended search operations.

In block 80, the observer device 12 may select a broadcast device 14 to perform a device scan. The device selected may be based on the signal strength information stored by the observer device 12. For instance, the observer device 12 may select a broadcast device that is farthest away to extend a search area to a greater extent. It is to be appreciated that the observer device 12 may employ a minimum signal strength threshold such that the device selected may not be the device with the weakest signal. For instance, the signal strength of an absolute farthest device may be too weak such that the observer device 12 may not be able to reliably establish a connection. Accordingly, the observer device 12 instead selects a device that is far, but not too far such that a connection is unreliable. In another example, the observer device 12 may randomly select a broadcast device 14 for the search, where the probability of random selection is in proportion to a score. The score may be adjusted based on signal strength information such that the score is reduced as signal strength increase (i.e. as the device moves closer to observer device 12). The score may also be adjusted if previous device scans by other devices indicate close proximity so as to reduce a probability that proximate devices are selected for searches. Further, while selection of one broadcast device is described, it is to be appreciated that the observer device 12 may select multiple broadcast devices to perform scans simultaneously.

The observer device 12 may communicate a request to perform a scan to the broadcast device selected (e.g., the scanning device) in block 82. The observer device 12 may establish a connection with the scanning device and configure the scanning device for the scan operation. During configuration, the observer device 12 may select a compression or encoding scheme to be employed by the scanning device to relay information back to the observer device 12.

In block 84, the observer device 12 may receive an advertising message from the broadcast device selected to perform a scan. The advertising message may include additional information (e.g. search results) corresponding to other broadcast devices discovered during the scan. For instance, the additional information may include identities and statuses of discovered devices, signal strength measurements associated with discovered devices, estimates on nearest device neighbors, etc.

In block 86, the observer device 12 may transmit a scan request message in response to the advertising message. In block 88, the observer device 12 may receive a scan response message responsive to the scan request message. The scan response message may include optional data that could not be transmitted in the advertising message due to space constraints, for example.

In block 90, the observer device 12 updates device information based on the additional information received in the advertising message in block 84 or the scan response message in block 88. In block 92, the observer device 12 determines whether the extended search should continue. For instance, the updated information may indicate that missing devices still exist. If the search is to continue, the observer device 12 selects a next scanning device in block 80. If the search will not continue, the observer device 12 returns to normal operation and listens for advertising messages in block 74.

Figure 8:
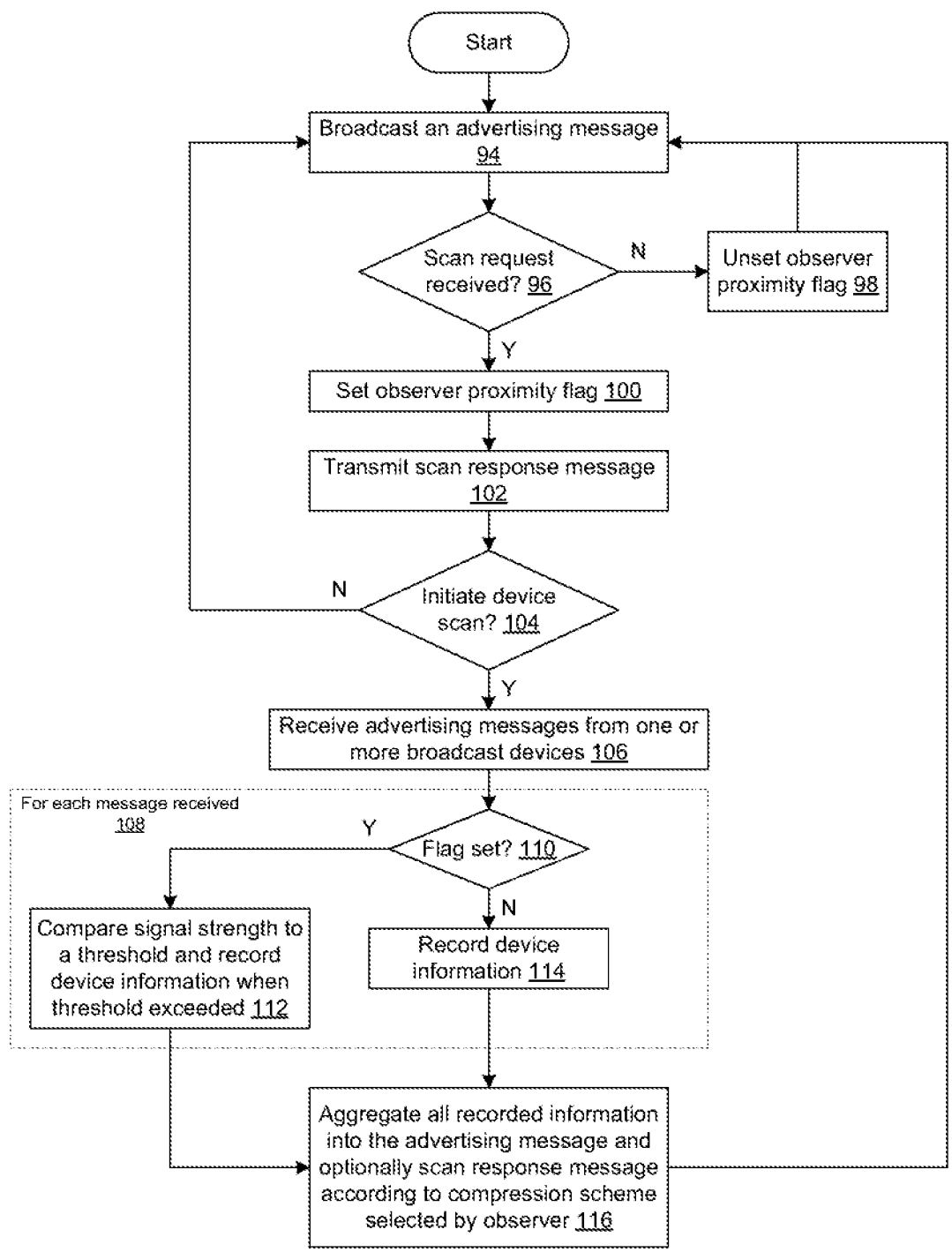
FIG. 8 is a flow diagram of a representative method of searching for broadcast devices in an environment on behalf of an observer and relaying information to the observer.

Referring to FIG. 8, exemplary actions carried out by the broadcast device 14 are illustrated. The actions carried out by the broadcast device 14 may, in some case, be complementary to the actions carried out by the observer device 12, which were described above. The logical flow of conducting anchor channel control by the broadcast device 14 may start in block 94. In block 94, the broadcast device 14 transmits an advertising message. In block 96, the broadcast device 14 determines if a scan request message is received from an observer device. If a scan request message is not received, the broadcast device 14 unsets an observer proximity flag in block 98 and returns to block 94 to periodically transmit the advertising message in accordance with a configured advertising interval. In one example, the broadcast device 14 may utilize a threshold value to determine when to unset the observer proximity flag. For instance, if, at block 96, a threshold number of advertising messages were sent without any being followed by a scan request message, then the broadcast device 14 may unset the observer proximity flag.

If, in block 96, it is determined that a scan request message is received, the broadcast device 14 sets the observer proximity flag in block 100. The observer proximity flag provides an indication that the advertising message was heard by an observer device and, thus, that the broadcast device is in proximity to an observer device. The broadcast device 14 may transmit a scan response message to the observer device in block 102. The scan response message is a responsive communication to the scan request message from the observer device. It is to be appreciated that block 102 is optional and the broadcast device 14 may not transmit the scan response message.

In block 104, it is determined whether a device scan should be initiated. For instance, the observer device 12 may establish a connection with the broadcast device 14 and configure the broadcast device 14 to perform a device scan. If a device scan is not to be performed, the broadcast device 14 returns to block 94 to periodically transmit the advertising message in accordance with a configured advertising interval. If a scan is to be performed, the broadcast device 14 may listen for and receive advertising messages from one or more broadcast devices in block 106.

In block 108, the broadcast device 14 processes each advertising message received as shown. For instance, for received advertising message, the broadcast device 14 determines whether the observer proximity flag is set in block 110. If the flag is set, the broadcast device 14, in block 112, compares a measured signal strength associated with the advertising message with a threshold and records device information extracted from the advertising message when the threshold is exceed. If the flag is not set, the broadcast device 14, in block 114, records device information extracted from the advertising message. Device information may include a device identifier, a device or subject status, signal strength information associated with the device, etc.

In block 116, the broadcast device 14 aggregates recorded information from each received advertising message into its own advertising message in accordance with a compression or encoding scheme selected by the observer device 12 when requesting the search. If the advertising message cannot accommodate the aggregated information, the remaining information can be included in the scan response message. The broadcast device 14 returns to block 94 and transmits the advertising message that includes the aggregated information.

System Architecture

Figure 9:
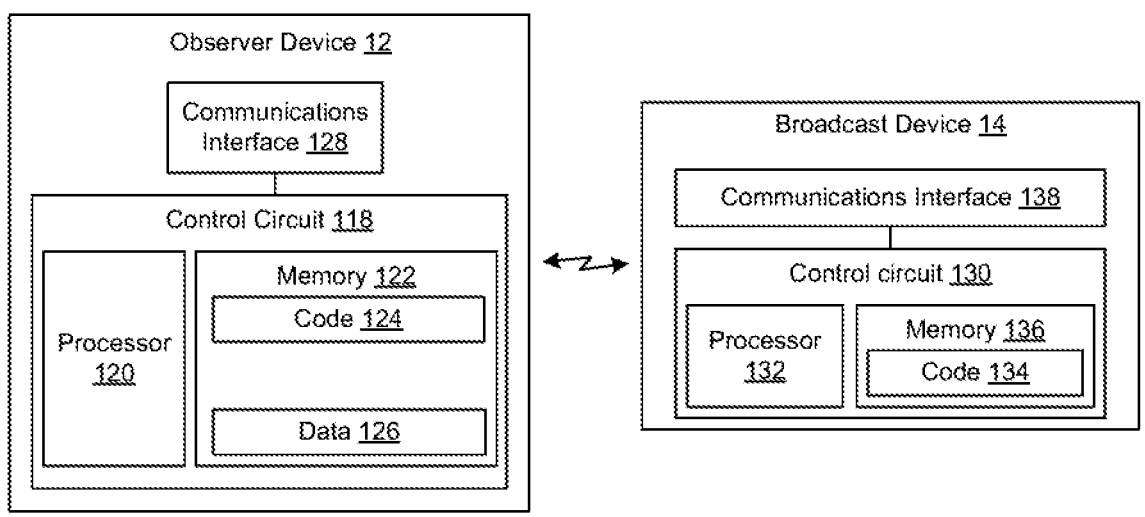
FIG. 9 is a schematic block diagram of an exemplary system and device architecture suitable for implementing various aspects disclosed herein.

FIG. 9 is a schematic diagram of an exemplary system 10 for implementing the disclosed techniques. It will be appreciated that the illustrated system is representative and other systems may be used to implement the disclosed techniques. The exemplary system 10 includes observer device 12 that may be any device capable of tracking, monitoring, or communicating with other devices within an area. For instance, the observer device 12 may be a computer, a mobile telephone (e.g. a "smartphone"), a tablet computing device, a device that uses machine-type communications, a user equipment as contemplated under 3GPP standards, etc.

The observer device 12 may include operational components for carrying out communications, device searching as described herein, and other functions of the observer device 12. Referring to the exemplary embodiment shown in FIG. 9, the observer device 12 includes a control circuit 118 that may be responsible for at least a portion of the overall operation of the observer device 12, including controlling the observer device 12 to carry out the operations described above.

The control circuit 118 may include a processor 120 that executes code, such as an operating system 124 and/or various applications 126, to carry out various functions of the observer device 12. The functions described in this disclosure document may be embodied as part of code 124 or as part of other dedicated logical operations of the observer device 12. The logical functions and/or hardware of the observer device 12 may be implemented in other manners depending on the nature and configuration of the observer device 12. Therefore, the illustrated and described approaches are just examples and other approaches may be used including, but not limited to, the control circuit 118 being implemented as, or including, hardware (e.g., a microprocessor, microcontroller, central processing unit (CPU), etc.) or a combination of hardware and software (e.g., a system-on-chip (SoC), an application-specific integrated circuit (ASIC), field programmable gate array (FPGA), etc.).

The code 124 and any stored data 126 (e.g., data associated with the operation of the observer device 12, or information related to other devices) may be stored on a memory 122. The code 124 may be embodied in the form of executable logic routines (e.g., a software program) that is stored as a computer program product on a non-transitory computer readable medium (e.g., the memory 122) of the observer device 12 and is executed by the processor 120.

The functions described as being carried out by the observer device 12 may be thought of as methods that are carried out by the observer device 12.

The memory 122 may be, for example, one or more of a buffer, a flash memory, a hard drive, a removable media, a volatile memory, a non-volatile memory, a random access memory (RAM), or other suitable device. In a typical arrangement, the memory 122 includes a non-volatile memory for long term data storage and a volatile memory that functions as system memory for the control circuit 118. The memory 122 is considered a non-transitory computer readable medium.

In one embodiment, the observer device 12 includes a communications interface 128 (e.g., communications circuitry) that enables the observer device 12 to establish various wireless communication connections. In the exemplary embodiment, the communications interface 128 includes a Bluetooth interface. Wired communications interfaces 128 also may be present. The communications interface 128 is operational to conduct communications with other devices over a communications medium that may include one or more of a local device connected to the observer device 12, a cellular radio network, a local area network (e.g., WiFi network), a Bluetooth network, the Internet, etc.

The broadcast device 14 monitored by observer device 12 may be a beacon, a tag, or another computing device that enables tracking and monitoring of a status or condition of an object associated with the broadcast device 14. As shown in FIG. 9, the broadcast device 14 may include operational components for carrying out wireless communications, device searching as described herein, and other functions of the broadcast device 14. For instance, among other components, the broadcast device 14 may include a control circuit 130 that is responsible for overall operation of the broadcast device 14, including controlling the broadcast device 14 to carry out the operations described in greater detail above. The control circuit 130 includes a processor 132 that executes code 134, such as a software application. The functions described in this disclosure document may be embodied as part of the code 134 or as part of other dedicated logical operations of the broadcast device 14. The logical functions and/or hardware of the broadcast device 14 may be implemented in other manners depending on the nature and configuration of the broadcast device 14. Therefore, the illustrated and described approaches are just examples and other approaches may be used including, but not limited to, the control circuit 130 being implemented as, or including, hardware (e.g., a microprocessor, microcontroller, central processing unit (CPU), etc.) or a combination of hardware and software (e.g., a system-on-chip (SoC), an application-specific integrated circuit (ASIC), a field programmable gate array (FPGA), etc.).

The code 134 and any stored data (e.g., data associated with the operation of the broadcast device 14) may be stored on a memory 136. The code 134 may be embodied in the form of executable logic routines (e.g., a software program) that is stored as a computer program product on a non-transitory computer readable medium (e.g., the memory 136) of the broadcast device 14 and is executed by the processor 132. The functions described as being carried out by the broadcast device 14 may be thought of as methods that are carried out by the broadcast device 14.

The memory 136 may be, for example, one or more of a buffer, a flash memory, a hard drive, a removable media, a volatile memory, a non-volatile memory, a random access memory (RAM), or other suitable device. In a typical arrangement, the memory 136 includes a non-volatile memory for long term data storage and a volatile memory that functions as system memory for the control circuit 130. The memory 136 is considered a non-transitory computer readable medium.

The broadcast device 14 includes communications circuitry that enables the broadcast device 14 to send and receive message and to establish various communication connections. For instance, the broadcast device 14 may have a communications interface 138 over which wireless communications are conducted with the observer device 12. The communications interface 138 may include a radio circuit having one or more radio frequency transceivers (also referred to as a modem), at least one antenna assembly, and any appropriate tuners, impedance matching circuits, and any other components needed for the various supported frequency bands and radio access technologies. In the exemplary embodiment, the communications interface 138 includes a Bluetooth interface.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method of searching for broadcast devices by an observer device, comprising:
   receiving respective advertising messages from one or more broadcast devices;
   determining whether to initiate an extended search for additional broadcast devices based on the advertising messages received from the one or more broadcast devices; and
   when the extended search is determined,
   selecting a scanning device to perform the extended search from among the one or more broadcast devices from which advertising messages are received;
   requesting the scanning device to perform the extended search, the extended search being a search for additional broadcast devices; and
   receiving at least one message with search results from extended search performed by the scanning device, wherein the search results indicate further advertising messages received by the scanning device from the additional broadcast devices.

2. The method of claim 1, further comprising:
   transmitting scan request messages to each of the one or more broadcast devices from which advertising messages are received; and
   receiving respective scan response messages from the one or more broadcast devices in response to the scan request messages.

3. The method of claim 1, wherein the message containing the search results is an advertising message or both the advertising message and a scan response message.

4. The method of claim 1, wherein the search results include information corresponding to one or more broadcast devices forming a set of devices within a range of the observer device and information corresponding to one or more broadcast devices forming a set of devices outside the range of the observer device, and
   wherein the information corresponding to the set of devices within the range of the observer device includes identities of broadcast devices estimated to be within a threshold distance from the scanning device.

5. The method of claim 1, further comprising storing signal strength information for the one or more broadcast devices.

6. The method of claim 5, wherein selecting the scanning device comprises at least one of:

selecting a broadcast device estimated to be distant based on the signal strength information; or selecting a broadcast device based on the signal strength information and search results from a previous scanning device.

7. The method of claim 5, further comprising:

assigning a score to each broadcast device based on the signal strength information;

reducing the score associated with any broadcast device indicated in the search results from the scanning device as being within the threshold distance from the scanning device; and selecting the scanning device based on respective scores assigned to each broadcast device.

8. The method of claim 1, further comprising:

determining whether to continue the extended search; and selecting a next scanning device from among the one or more broadcast devices; and requesting the next scanning device to perform a search for additional broadcast devices.

9. The method of claim 1, wherein requesting the scanning device to perform a search comprises indicating a compression scheme to be utilized to package the search results.

10. The method of claim 9, further comprising:

evaluating the search results for ambiguity; and requesting the scanning device to retransmit the search results with a different compression scheme.

* * * * *